(12) United States Patent
Romunen

(10) Patent No.: US 7,880,324 B2
(45) Date of Patent: Feb. 1, 2011

(54) TRANSMITTER WITH A REMOTE UNIT IN AN ELECTRIC NET DATA TRANSMISSION SYSTEM

(76) Inventor: Jorma Kullervo Romunen, Kauriinpelto T 170, FI-33880 Lempaala (FI)

(*) Notice: Subject to any disclaimer, the term of this patent is extended or adjusted under 35 U.S.C. 154(b) by 254 days.

(21) Appl. No.: 10/551,388

(22) PCT Filed: Mar. 30, 2004

(86) PCT No.: PCT/FI2004/000183
§ 371 (c)(1), (2), (4) Date: Sep. 29, 2005

(87) PCT Pub. No.: WO2004/088869
PCT Pub. Date: Oct. 14, 2004

(65) Prior Publication Data
US 2006/0208567 A1    Sep. 21, 2006

(30) Foreign Application Priority Data
Mar. 31, 2003    (FI) .................................. 20030470

(51) Int. Cl.
*H02J 3/02* (2006.01)
*G05B 11/01* (2006.01)
(52) U.S. Cl. .................................... 307/3; 340/310.18
(58) Field of Classification Search .................. 361/86; 307/1, 3; 340/310.18
See application file for complete search history.

(56) References Cited

U.S. PATENT DOCUMENTS

| 5,838,726 | A | 11/1998 | Nemoto et al. | |
| 6,727,804 | B1* | 4/2004 | Lesguillier et al. | 340/310.13 |
| 6,867,689 | B2* | 3/2005 | Yokoo | 375/222 |
| 7,007,305 | B2* | 2/2006 | Carson et al. | 726/36 |
| 7,088,972 | B2* | 8/2006 | Brown et al. | 455/128 |

FOREIGN PATENT DOCUMENTS

| EP | 0 267 887 A1 | 5/1988 |
| EP | 0 632 602 B1 | 12/2001 |
| WO | WO 01/61881 A1 | 8/2001 |
| WO | WO 02/071573 A1 | 9/2002 |

* cited by examiner

*Primary Examiner*—Michael Rutland Wallis
(74) *Attorney, Agent, or Firm*—Stites & Harbison PLLC; Jeffrey A. Haeberlin

(57) ABSTRACT

A transmitter for sending a data transmission signal to an f electric net, whereby the apparatus comprises signal-shaping and adjustment devices (3) and connecting devices (50) including necessary accessories for connection to the electric net, signal amplifiers (20) and a connecting cable between the transmitter and the connecting point of the electric net, as for instance 230 V, 50 Hz phase rail (L) and zero rail (N) or a wall outlet as connecting points. The apparatus is divided into two or several parts, at least a first part (3) and a second part (TX/REMU), whereby second part (TX/REMU) includes at least connecting a unit (50) for connection to the electric net and a connecting cable and for connecting said second part to the electric net, whereby the length ($L_W$) of connecting cable is under 5 m.

4 Claims, 5 Drawing Sheets a) 1-phase supply into electrical network

TX/REMU.

TRANSMITTER WITH A REMOTE UNIT IN AN ELECTRIC NET DATA TRANSMISSION SYSTEM

The invention is suited for use in electric nets i.e., electrical networks, for instance 12 VAC/DC, 24 VAC/DC, 48 VAC/DC, 115 VAC, 400 VAC, to prevent the level from getting lower of a signal, sent by a transmitter of a data transmitting system in a said net, with small values of load impedance $Z_{LOAD}$ (in voltage rail) and with great values of the equivalent series impedance $Z_W$ of the electric net cable (long connecting cable to electric net, that is the data transmission distance). By means of a method as per the invention and the structure of the transmitter it is possible to keep the signal $U_{LOAD}$ sent by the transmitter large enough in the voltage rail of the load impedance $Z_{LOAD}$ even if there were from the transmitting apparatus to the electric net voltage rail a distance of tens of or even over hundred meters. Without the method reliable operation under above conditions would be occasionally impossible, because of a too low transmission signal.

Generally in traditional solutions there are two problems:
1) The level of transmission signal gets strongly lower, when the net impedance is quite low.
2) For instance, in transmitting situation no signal high enough can be achieved between 230 V 50 Hz phase and zero rail (L-N) of the electric net, since energy consuming apparatuses cause on the signal frequency a quite a strong load, i.e. low load impedance $Z_{LOAD}$. This is influenced by the fact that there is from the transmitting apparatus a long cable connection (the equivalent series impedance $Z_W$ of the cable is high on signal frequency) to above phase and zero rail. According to the principle of voltage distribution the $U_{LOAD}$ is then low, i.e. the situation is bad. FIG. 1 shows the attenuation impact of the cable in a traditional solution, when the $Z_{LOAD}=1$ ohm.

In the more developed modern techniques the problem presented in pos. 1) is already solved so that the outgoing signal of the transmitter remains almost constant, i.e. independent of the net impedance. However, it doesn't be of any help on resolving the problem of pos. 2), because of the series impedance $Z_W$ of the connecting cable of the apparatus and/or the cable and of the low load impedance $Z_{LOAD}$ between phase and zero rail in the electric net. There is a surprisingly good solution to the problem in this invention, where the impact of attenuation on the signal of the series impedance $Z_W$ of the connecting cable is eliminated almost completely.

FIG. 2 shows the impact of attenuation the cable in the invention, when the $Z_{LOAD}$ is 1 ohm.

In transmitting situation it is decisive that for instance the "rail signal" $U_{LOAD}$ of the fuse box of an apartment, which is the signal voltage between phase rail L and zero rail N in fuse box $U_{L-N}$, is as high as possible even with low $Z_{LOAD}$ values of the load impedance.

The apparatus as per the invention is characterized in that the equipment is divided into two or several parts, at least in a first part (3) and a second part (TX/REMU), whereby the second part (TX/REMU) includes at least a connecting unit (50) for connection to the electric net and a connecting cable for connection of said part to the electric net, whereby the length $L_W$ of the connecting cable is under 5 meters.

The invention is based on that an apparatus operating in the electric net is in a way divided into two parts, of which the first part comprises most suitably the equipment to form and adjust the signal 31 and the second part comprises a transmitter a remote unit, hereafter called TX/REMU. The transmitter remote unit TX/REMU is placed as close as possible to the wall outlet of an electric net 230 V, 50 Hz or to a phase and zero rail for instance in a fuse box. The length of the connecting cable is held as small as possible, e.g. $L_W$ is under 5 meters or more suitably under 3 meters or even under 1 meter, as shown in FIG. 4. Possibly the transmitter remote unit TX/REMU can be placed in the voltage rail or even plugged in a wall outlet, if regulations allow. Then there is no connecting cable and the $L_W$ is 0 meter. The first part of the apparatus can be placed even far from the remote unit, the distance can be tens or even hundreds of meters.

The invention is disclosed with reference to the enclosed drawing figures, where FIG. 1 shows the attenuation impact of the cable in a traditional solution, when the $Z_{LOAD}$ is 1 ohm.

Figure 1:
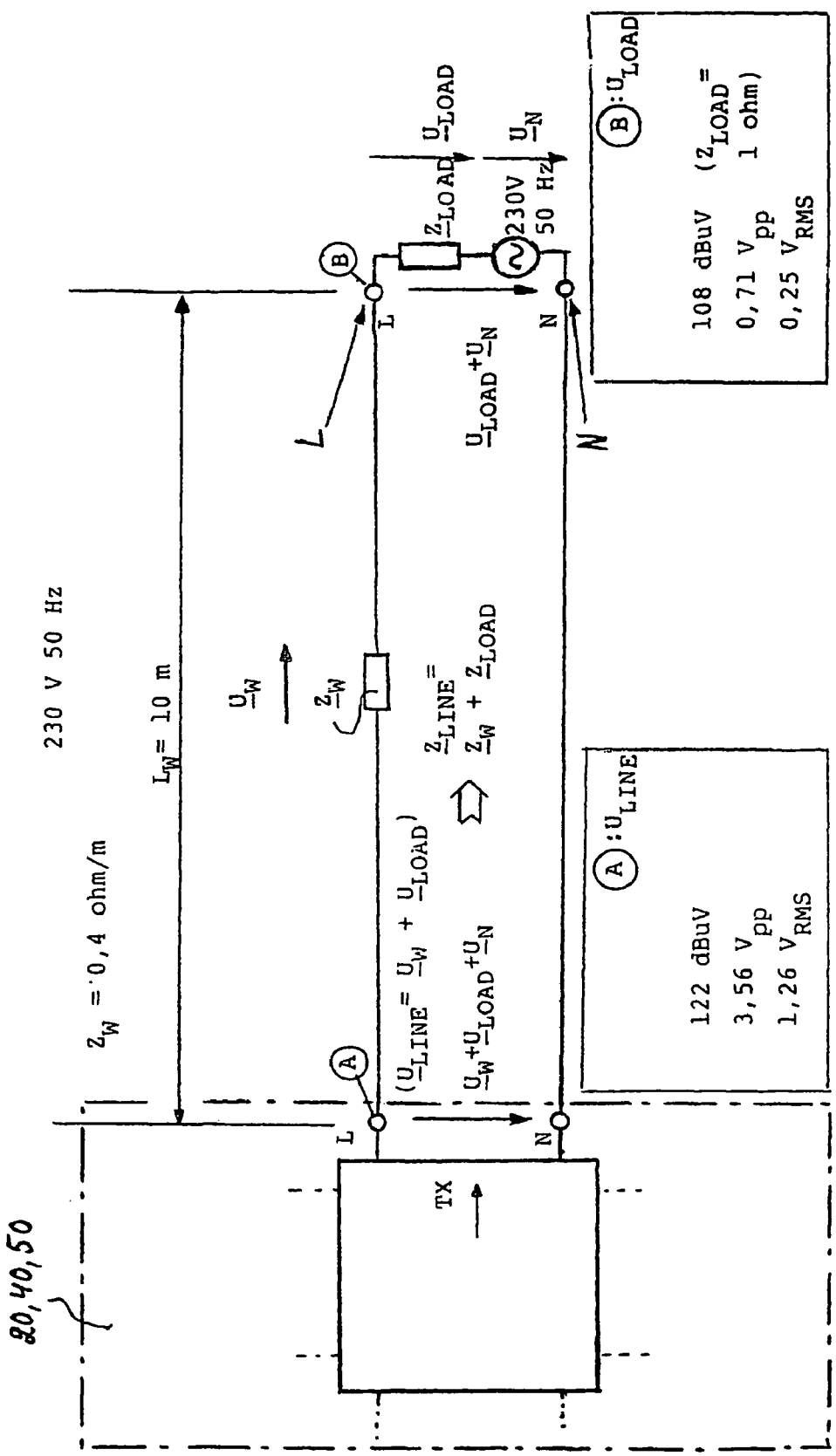
Figure 1A:
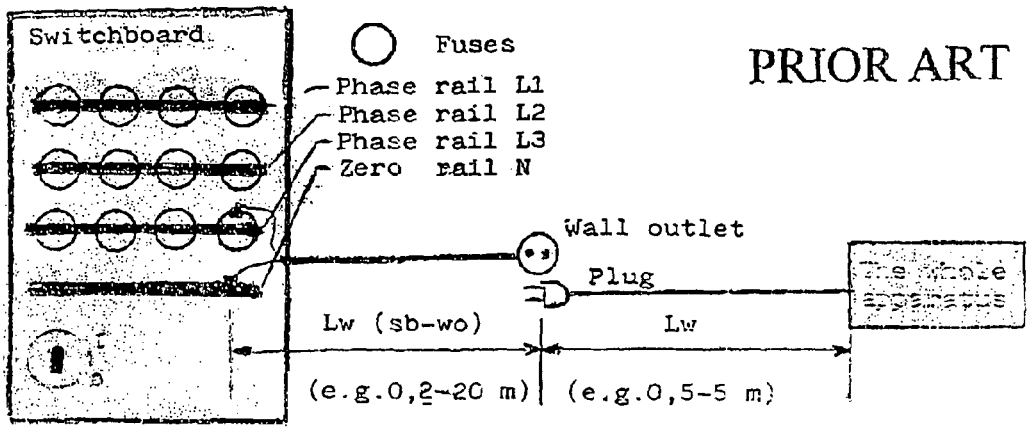
Figure 1B:
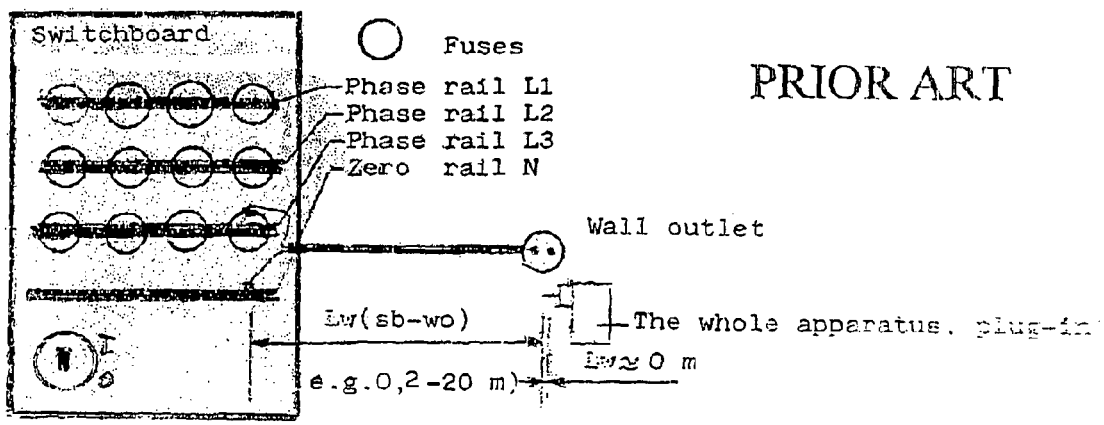
Figure 2:
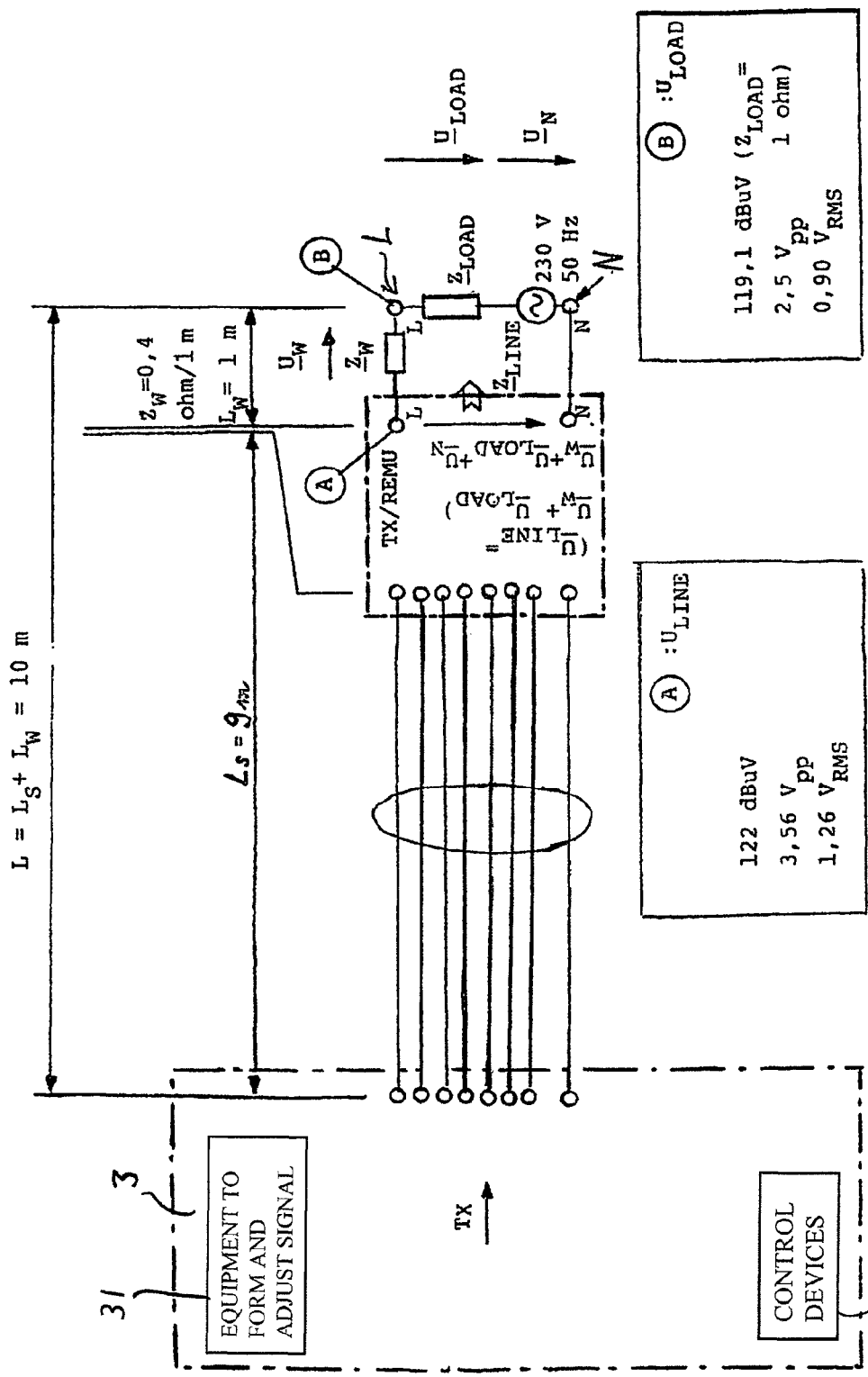
FIG. 2 shows the attenuation impact of the cable in the invention, when the $Z_{LOAD}$ is 1 ohm.

The transmitter remote unit TX/REMU gets the steering of its operation over the signal cable from the first part of the bipartitioned apparatus. The length $L_S$ of the signal cable can be tens and even hundreds of meters and has no impact on the size of the "rail signal" $U_{LOAD}$, which is to be transmitted to the electric net. Refer FIGS. 2 and 4. The first part 3 and second part TX/REMU can be connected also wirelessly with an optical fibre cable or otherwise.

The transmitter remote unit TX/REMU is located for instance in a living room or in the main electric center, (e.g., switchboard) just beside the fuse box (fuses and phase rail and zero rail and switch) or in connection with it in its own box or in a wall outlet or near it. A cable comes to it from the fuse box rails over the fuse or from the wall outlet and, in addition, the signal cable from the first part of the apparatus, where generally the operation lights and switches are located.

The transmitter remote unit TX/REMU contains for instance a signal amplifier 20 (e.g. 95-125 kHz) low pass filter or band pass filter 40, but in any, case it contains a field unit connecting unit 50 for connection to the electric net. In addition, the remote unit TX/REMU can contain many other operation blocks and functions. It can also have a mains transformer and a voltage regulator.

The first part 3 of the apparatus can for instance in an apartment be placed in the signal cable end, even in a living room. Generally it includes the signal lights and control devices 32 such as operating switches and other operating switches and other operation means of the apparatus.

Figure 3:
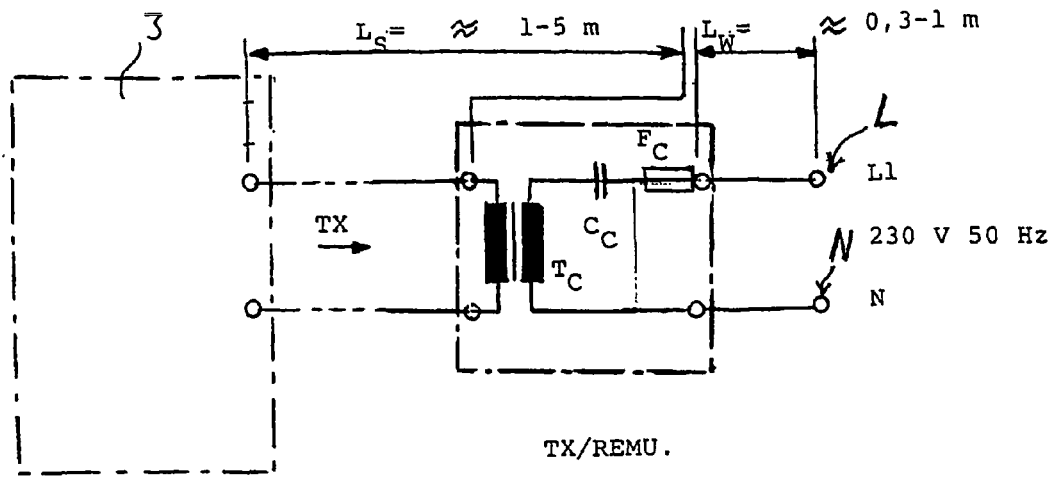
FIG. 3 shows a simple application of the invention.
Figure 3:
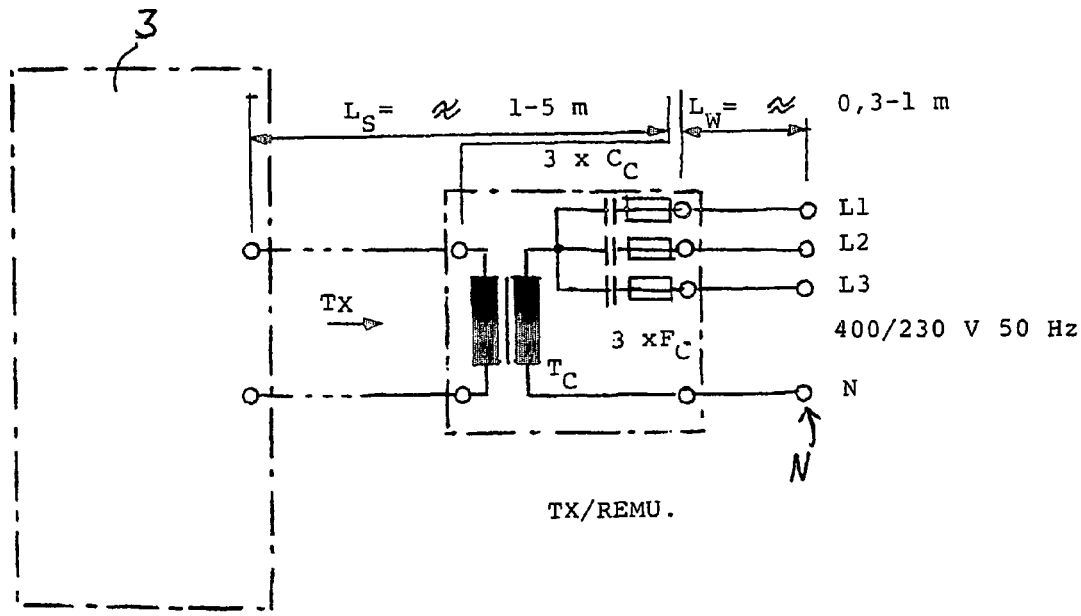
Figure 4:
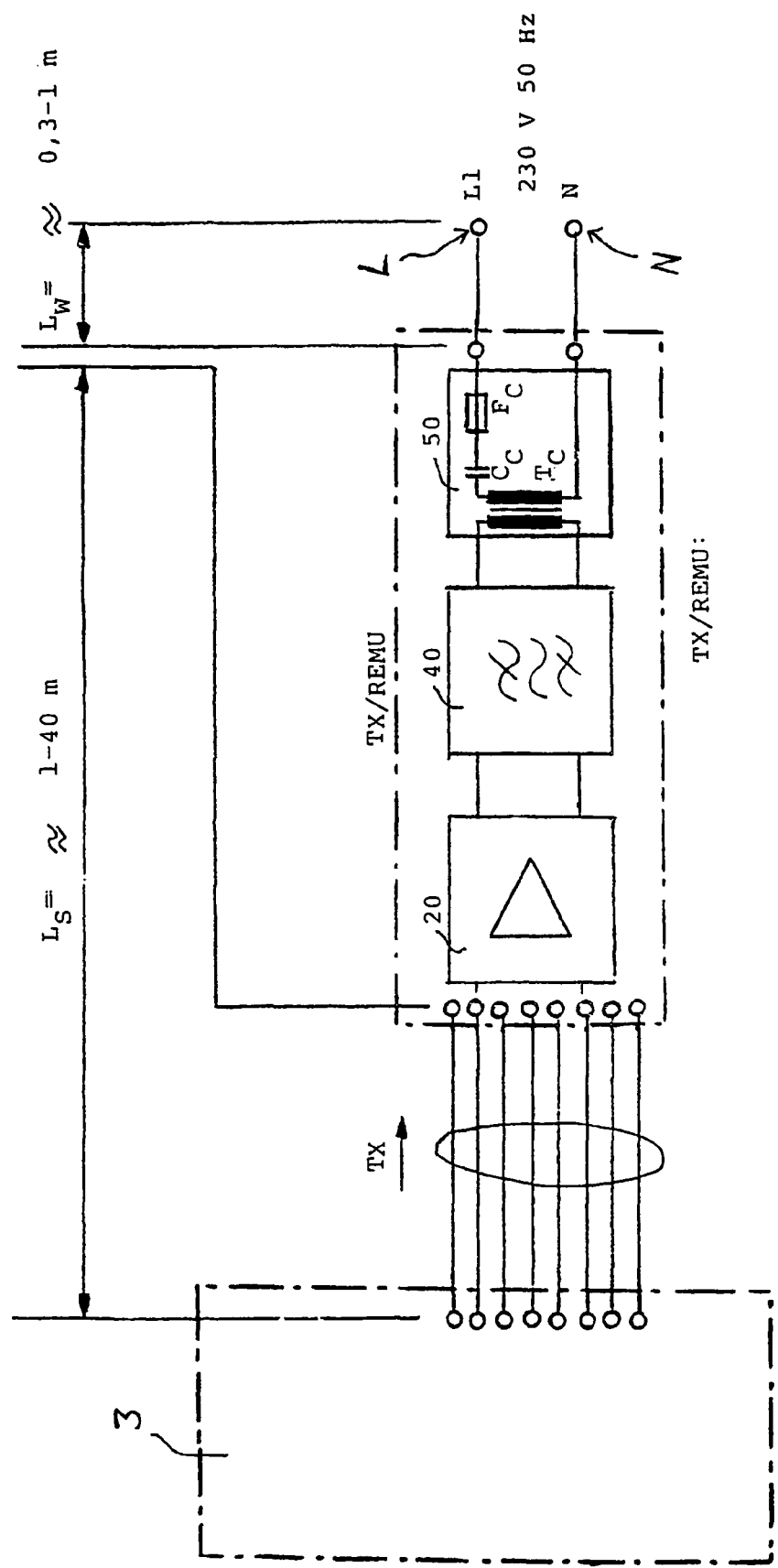
FIG. 4 shows an effective application of the invention.

FIG. 3 shows a simple application of the invention and FIG. 4 a more efficient application of the invention.

The second part, remote unit TX/REMU, of the transmitter must be as to its mechanics as small as possible and suitably shaped, so that it could be utilized appropriately in the main electric centre of an apartment house or in the kWh-meter closet, for instance. There is not often much place available. The connecting cable taken to the phase and zero rail L, N or to a wall outlet must be as short as possible (e.g. $L_W$=under 1 m). Regulations restricting the assembly must be taken into consideration.

The invention claimed is:

1. A transmitter apparatus for sending a data transmission signal over power lines of an electrical power network, wherein the transmitter apparatus comprises control devices, signal-shaping and adjustment devices, and connecting devices for connection to the electrical network, including a signal amplifier, and a connecting cable between the transmitter apparatus and a connecting point of the electrical power network, wherein the improvement comprises:

wherein the transmitter apparatus for sending the data transmission signal over power lines of the electrical power network is divided and physically separated into at least a first part and a second part connected by one of a signal cable, an optical fiber, and a wireless connection, said first part including at least the control devices, one of said first and second part including the signal shaping and adjustment devices for generating the data transmission signal, said second part including at least a connecting unit for coupling the data transmission signal to the electrical power network, and the connecting cable connecting said second part at least near to phase and zero rails or to a wall outlet of the electrical power network;

wherein the first part steers operation of the second part over the one of the signal cable, the optical fiber, and the wireless connection; and wherein the length of the connecting cable is under 5 m.

2. A transmitter apparatus according to claim 1 wherein the length of the connecting cable is under 1 m when the second part is connected to the phase and zero rails or to the wall outlet of the electrical network.

3. A transmitter apparatus according to claim 1 wherein the connecting cable can be connected to voltage rails in a direct-current electrical power line or an alternating-current electrical power line or to another connection point of an electrical power line.

4. A transmitter apparatus according to claim 1 wherein the connecting cable can be connected to 3-phase rails or to a 3-phase outlet or to another connection point of a network cable.

* * * * *